(12) United States Patent
Gagliardi, Jr.

(10) Patent No.: US 7,029,388 B2
(45) Date of Patent: Apr. 18, 2006

(54) METHOD OF MAKING A FOOD PRODUCT FROM THE BACK OF A BIRD AND THE PRODUCT PRODUCED IN ACCORDANCE WITH THE METHOD

(75) Inventor: Eugene D. Gagliardi, Jr., Atglen, PA (US)

(73) Assignee: Skippack Creek Corporation, Wilmington, DE (US)

( * ) Notice: Subject to any disclaimer, the term of this patent is extended or adjusted under 35 U.S.C. 154(b) by 0 days.

(21) Appl. No.: 11/125,914

(22) Filed: May 10, 2005

(65) Prior Publication Data

US 2005/0266786 A1    Dec. 1, 2005

Related U.S. Application Data

(60) Provisional application No. 60/570,770, filed on May 13, 2004.

(51) Int. Cl.
*A22C 21/00* (2006.01)

(52) U.S. Cl. ....................................... 452/198
(58) Field of Classification Search ............... 452/135, 452/136, 148, 160; 426/56, 572, 480
See application file for complete search history.

(56) References Cited

U.S. PATENT DOCUMENTS

| | | | | |
|---|---|---|---|---|
| 5,779,532 A | * | 7/1998 | Gagliardi, Jr. | 452/149 |
| 6,238,281 B1 | * | 5/2001 | Gagliardi, Jr. | 452/135 |
| 6,769,977 B1 | * | 8/2004 | Kuck | 452/135 |
| 6,939,217 B1 | * | 9/2005 | Gagliardi, Jr. | 452/149 |

* cited by examiner

*Primary Examiner*—Thomas Price
(74) *Attorney, Agent, or Firm*—Akin Gump Strauss Hauer & Feld, LLP

(57) ABSTRACT

A method of cutting the back of a bird provides two boneless meat products. The back includes a backbone, a tail at the rear end of the backbone and an area of meat on each side of the backbone. The method includes cutting the back along a first cut line extending generally perpendicular to the backbone and proximate to the rear end of the backbone to remove the tail. The back is also cut along a second cut line extending at a first angle with respect to the backbone and proximate to the rear end of a first side of the backbone to remove a first generally triangularly shaped boneless meat product. The back is further cut along a third cut line extending at a second angle with respect to the backbone and proximate to the rear end of a second side of the backbone to remove a second generally triangularly shaped boneless meat product.

4 Claims, 1 Drawing Sheet

METHOD OF MAKING A FOOD PRODUCT FROM THE BACK OF A BIRD AND THE PRODUCT PRODUCED IN ACCORDANCE WITH THE METHOD

CROSS REFERENCE TO RELATED APPLICATIONS

This application claims the benefit of U.S. Provisional Patent Application No. 60/570,770 filed May 13, 2004 entitled "Method of Making a Food Product from the Back of a Bird and the Product Produced in Accordance with the Method", the subject matter of which is hereby incorporated herein by reference.

BACKGROUND OF THE INVENTION

The present invention relates generally to a method of making a food product from a bird and, more particularly, to a method of making a food product from the back of a bird and a food product made in accordance with the method.

Birds, such as poultry and fowl, are conventionally eviscerated, dressed and sold either as a whole bird or as severed parts, i.e., breasts, wings, etc. One of the parts which is often separated and sold is the back which may include a portion of the neck and tail. Typically, backs are sold with the skin in place and with the meat surrounding an elongated backbone extending generally from the tail to the neck.

In recent years, there has been an increasing demand for innovative meat products, particularly products which require less time for preparation and which include little or no waste. There has also been an increasing demand for meat products which are boneless or substantially boneless, making such products easier to consume. Hence, products such as boneless chicken breasts, chicken tenders, etc. have enjoyed great commercial success. Other innovative products such as hot wings, buffalo wings, etc. have also obtained enhanced popularity for the respective parts from which they are prepared.

While many uses can be found for most of the parts of a bird such as the breast, thigh, drumstick, wing, etc., there are little or no food products which can be made from the back of a bird. Traditionally, when a bird is cut up for parts, the back is either sold very cheaply for making soup or is ground up for feed, sold for bait or the like. Bird backs, have not been particularly amenable to enhanced commercial processing and/or preparation methods for a variety of reasons primarily related to the type of meat (dark versus light), the size and centralized location of the bone, etc. The present invention comprises a method of making a unique food product from back meat. The dark meat food product is boneless, relatively small in size and therefore easily consumable as "finger food".

BRIEF SUMMARY OF THE INVENTION

Briefly stated, the present invention comprises a method of cutting the back of a bird to provide two boneless meat products, the back including a backbone, a tail at the rear end of the backbone and an area of meat on each side of the backbone. The method comprises cutting the back along a first cut line extending generally perpendicular to the backbone and proximate to the rear end of the backbone to remove the tail. The back is cut along a second cut line extending at a first predetermined angle with respect to the backbone and proximate to the rear end of a first side of the backbone to remove a first generally triangularly shaped boneless meat product. The back is also cut along a third cut line extending at a second predetermined angle with respect to the backbone and proximate to the rear end of a second side of the backbone to remove a second generally triangularly shaped boneless meat product. In a preferred embodiment the first and second predetermined angles are in the range of fifteen to twenty degrees.

BRIEF DESCRIPTION OF THE SEVERAL VIEWS OF THE DRAWINGS

The foregoing summary as well as the following detailed description of a preferred embodiment of the invention will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
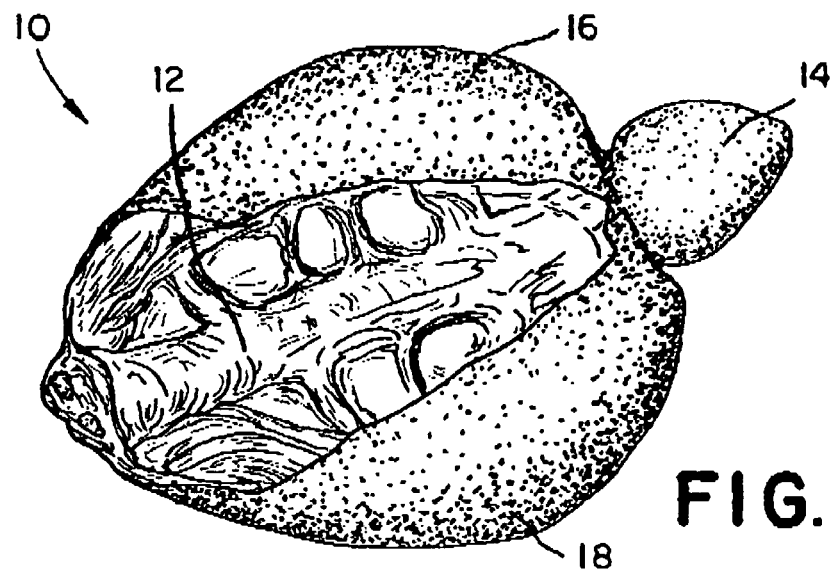
FIG. 1 is a top perspective view of the inside back of a bird which has been removed from the remainder of the bird.

FIG. 1 is a top perspective view of the inside back of a bird, in the present embodiment, a chicken back 10. It should be appreciated by those of ordinary skill in the art that while in describing the present embodiment a chicken back 10 is employed, any other type of poultry, fowl or other bird could alternatively be employed. Accordingly, it will be appreciated that the present invention is not limited to a method of cutting a chicken back 10 to provide boneless meat products.

The chicken back 10 as shown in FIG. 1 includes the centrally located backbone 12, tail 14 at the rear end of the backbone 12 and areas of dark meat 16, 18 located on first and second lateral sides of the backbone 12 and which typically remain with the backbone 12 when the legs (not shown) and back 10 are removed from a whole chicken. A portion of the chicken neck (not shown) may also be attached to the forward end of the backbone 12. The chicken back 10 as shown and described is typical of the type of back cut that is obtained when a whole chicken is cut up to remove its parts for use or sale.

Figure 2:
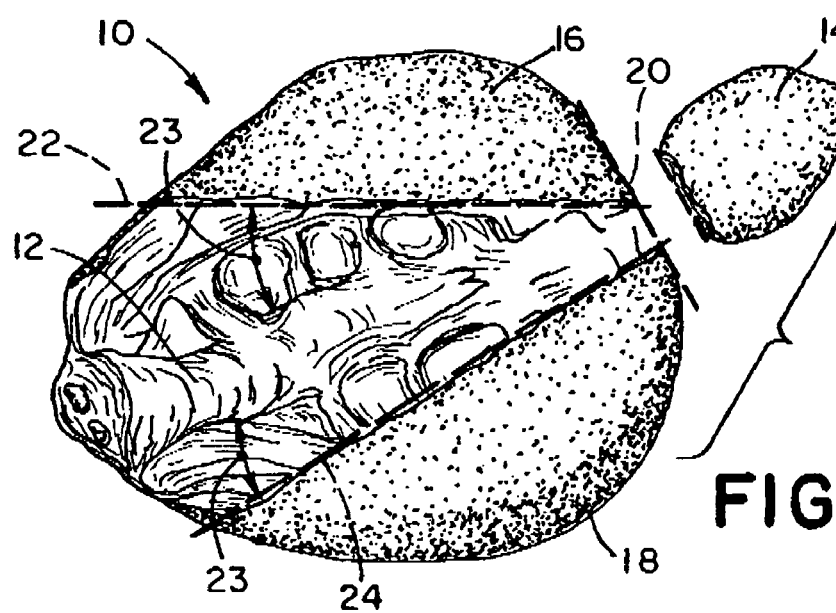
FIG. 2 is a view similar to FIG. 1 showing three cut lines in accordance with a preferred embodiment of the present invention.

FIG. 2 is a perspective view of the chicken back 10 of FIG. 1 showing three dashed cut lines 20, 22 and 24 imposed on the back 10 which are used in practicing the present method. The first cut line 20 extends generally perpendicular to the length of the backbone 12 between the rear end of the backbone 12 and the tail 14. In practicing the method of the present invention, a first cut is made along the first cut line 20 for the purpose of severing and removing the tail 14 from the backbone 12. The removed tail 14 may be disposed of or used in some other manner, such as for feed.

Figure 3:
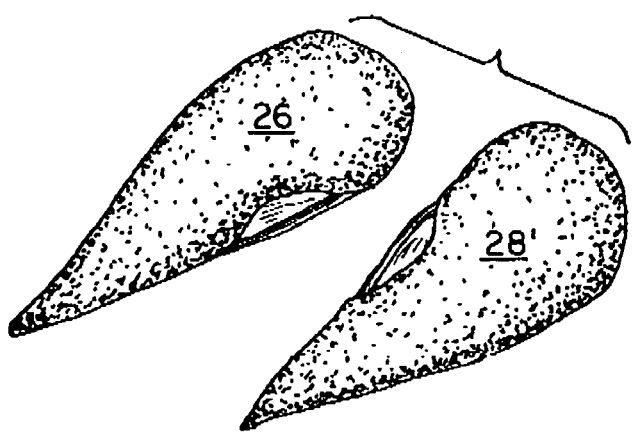
FIG. 3 is a top plan view of food products produced by cutting the back of FIG. 1 along the three cut lines shown in FIG. 2.

The second and third cut lines 22, 24 extend at first and second predetermined angles 23 with respect to the backbone 12 at the first and second lateral sides and proximate to the rear of the backbone 12. In the present embodiment the first and second predetermined angles 23 are in the range of approximately 15 to 20 degrees with respect to the backbone 12. It will be appreciated that either or both if the first and second predetermined angles may be greater than or less than the preferred 15 to 20 degrees. In practicing the present invention, second and third cuts are made along the second and third cut lines 22, 24 to remove substantial portions of the dark meat areas 16, 18 from the first and second lateral sides of the backbone 12. The remainder of the chicken back 10 may then be disposed of or used in some other manner such as for feed, bait or the like. The resulting generally triangularly shaped boneless dark meat products 26, 28 are shown in FIG. 3. The boneless dark meat products 26, 28 which may be referred to as "half backs™", may be prepared and cooked in any known manner such as by frying, baking, roasting, grilling, etc. The meat products 26, 28 may also be marinated, battered/breaded or coated with a flavoring of choice, such as barbeque sauce.

It will be appreciated by those of ordinary skill in the art that the three cuts along the cut lines 20, 22, 24 may be made in any desired order and may be made using a knife, saw, water knife or any other cutting device known to those of ordinary skill in the art. While the cuts along the three cut lines 20, 22, 24 may be made with the chicken back 10 oriented with the skin side down in the manner as shown, the cuts could alternatively be made with the chicken back 10 in some other orientation, such as upside down, if desired. The resulting boneless dark meat products 26, 28 may include the original chicken skin or the skin may be removed, if desired.

From the foregoing it can be seen that the present invention comprised a method of cutting the back of a bird to provide two generally triangularly shaped boneless dark meat products. It will be appreciated by those skilled in the art that changes could be made to the embodiment described above without departing from the broad inventive concepts thereof. It is understood, therefore, that this invention is not limited to the particular embodiment disclosed, but it is intended to cover modifications within the spirit and scope of the present invention as defined by the appended claims.

I claim:

1. A method of cutting the back of a bird to provide two boneless meat products, the back including a backbone, a tail at the rear end of the backbone and an area of meat on each side of the backbone, the method comprising:
    cutting the back along a first cut line extending generally perpendicular to the backbone and proximate to the rear end of the backbone to remove the tail;
    cutting the back along a second cut line extending at a first predetermined angle with respect to the backbone and proximate to the rear end of a first side of the backbone to remove a first generally triangularly shaped boneless meat product; and
    cutting the back along a third cut line extending at a second predetermined angle with respect to the backbone and proximate to the rear end of a second side of the backbone to remove a second generally triangularly shaped boneless meat product.

2. The method as recited in claim 1 wherein the first and second predetermined angles are generally the same.

3. The method as recited in claim 2 wherein the first and second predetermined angles are both in the range of 15 to 20 degrees.

4. A pair of triangularly shaped boneless meat products made in accordance with the method of claim 1.

* * * * *